United States Patent
Seki

(10) Patent No.: US 6,217,275 B1
(45) Date of Patent: Apr. 17, 2001

(54) PICKUP APPARATUS

(75) Inventor: Masatoshi Seki, Yukuhashi (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/207,905

(22) Filed: Nov. 6, 1998

(30) Foreign Application Priority Data

Nov. 10, 1997 (JP) .................................................. 9-307587

(51) Int. Cl.[7] .............................. B65G 47/90; B66C 1/46
(52) U.S. Cl. .................. 414/751.1; 294/99.1; 294/119.3
(58) Field of Search ................................. 294/86.4, 87.1, 294/88, 99.1, 106, 119.3; 269/22; 623/26; 901/30, 31, 36, 37; 198/803.7, 803.8; 414/751.1, 753.1, 941

(56) References Cited

U.S. PATENT DOCUMENTS 4,834,232 * 5/1989 Freermann .................... 294/119.3 X

FOREIGN PATENT DOCUMENTS

| 2440256 | * | 3/1976 | (DE) | 294/119.3 |
| 1338917 | * | 8/1963 | (FR) | 294/99.1 |
| 2653415 | * | 4/1991 | (FR) | 294/119.3 |
| 64-317990 | * | 12/1989 | (JP) | 294/99.1 |
| 1400878 | * | 6/1988 | (RU) | 294/119.3 |

* cited by examiner

Primary Examiner—Johnny D. Cherry
(74) Attorney, Agent, or Firm—Jordan and Hamburg LLP

(57) ABSTRACT

A pickup apparatus which can easily pick up and pull out a thin plate member from a number of thin plate members disposed alongside one another in a narrowly spaced relationship and which assists in automating the picking up and pulling out of the thin plate member. The pickup apparatus includes a pair of pincer members which pick up and pull out the thin plate member from a number of the thin plate members disposed in a side-by-side spaced arrangement in a tray by expanding or contracting a bag member interposed between the pincer members to open or close the pincer members.

16 Claims, 4 Drawing Sheets

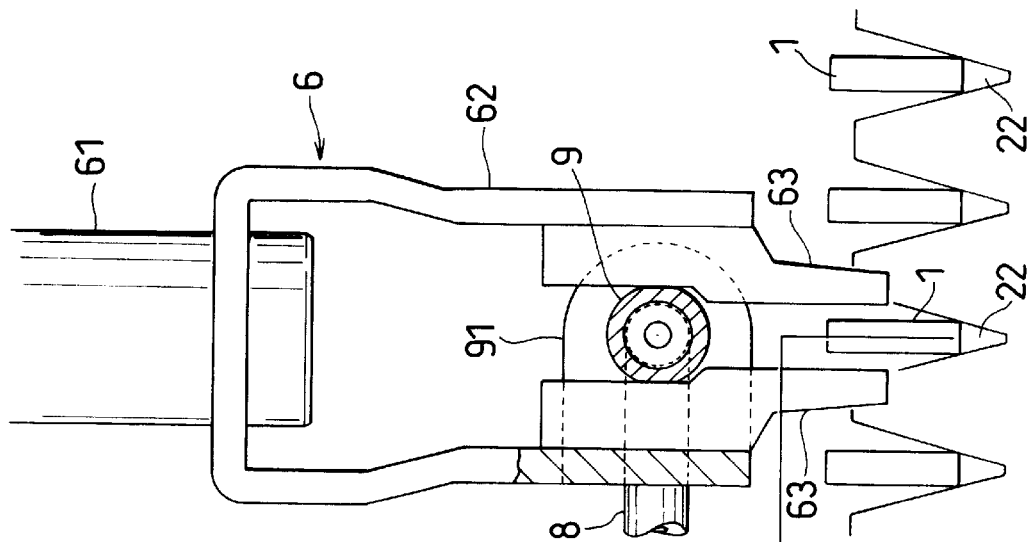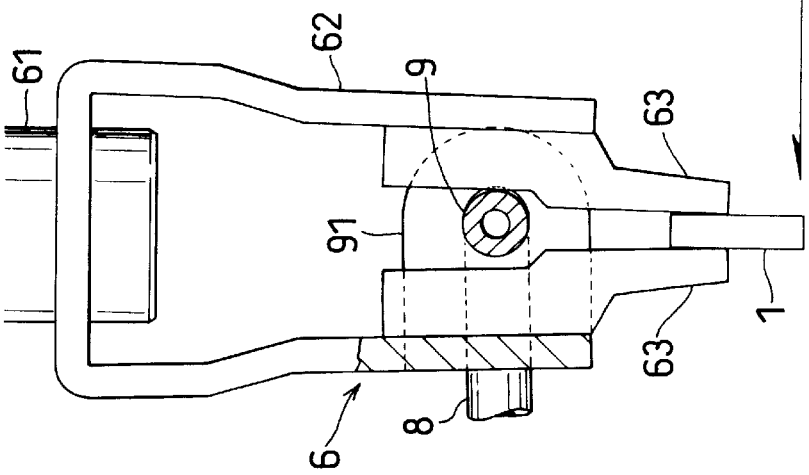

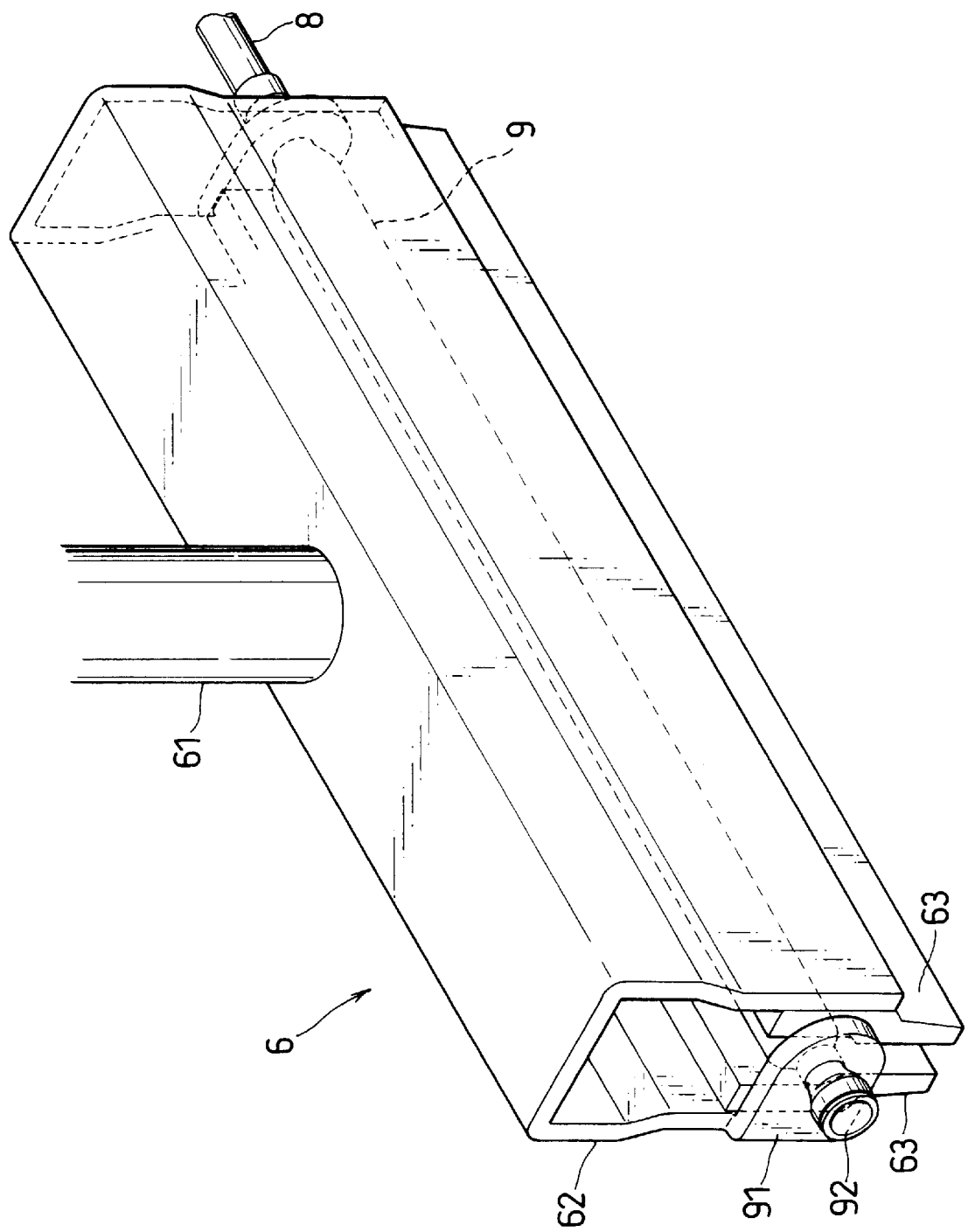

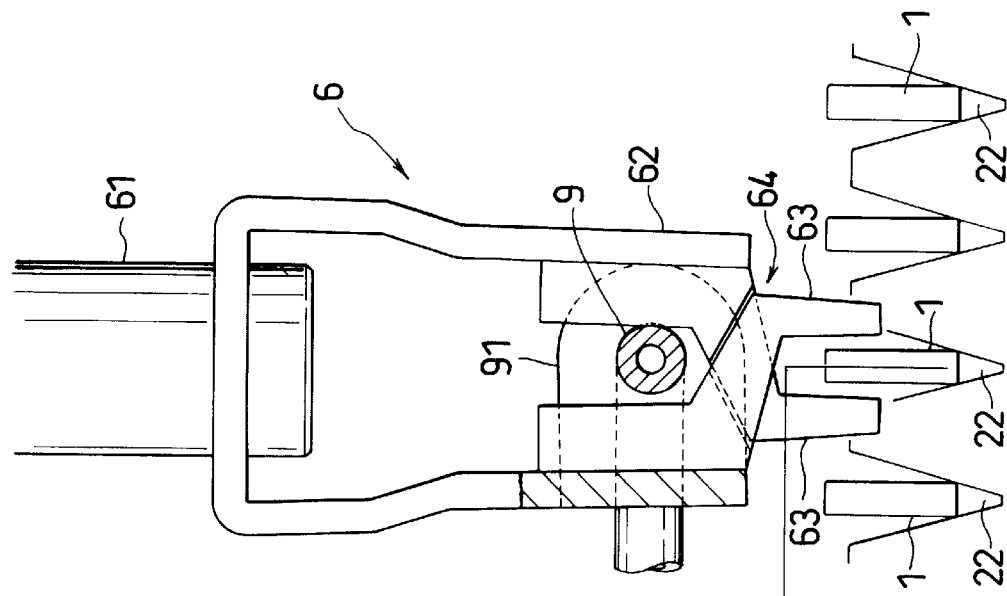
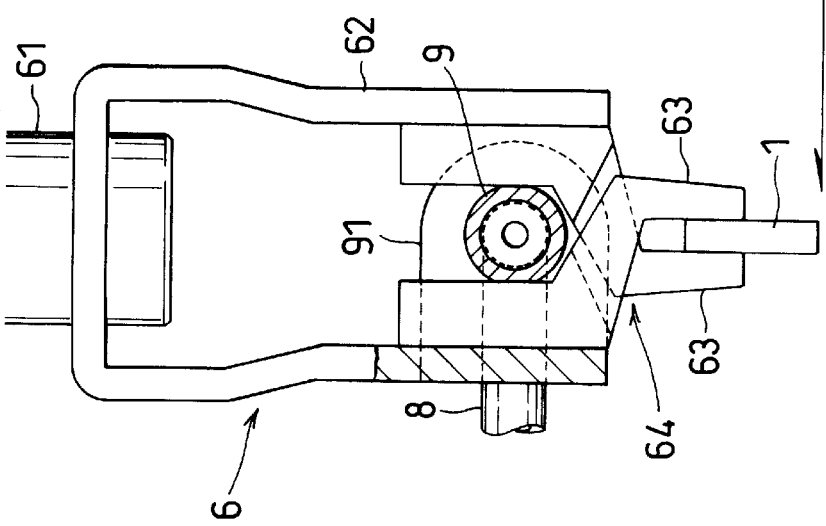

PICKUP APPARATUS

BACKGROUND OF THE INVENTION

The present invention relates to a pickup apparatus and, more particularly, to a pickup apparatus which selectively picks up and pulls out any thin plate member individually from a number of thin plate members accommodated in a number of respective sections of a tray.

Conventionally, chip resistors, etc. are manufactured in such a manner that a large-size insulated board with a surface electrode and a resistor formed each in unit regions is divided into long bar-shaped board members along breaking grooves pre-formed in the board. The bar-shaped board members are coated with a paste for forming a side electrode. A large number of the bar-shaped board members are placed side by side in a baking tray and they are then baked therein. Thereafter, it is determined whether any of the bar-shaped board members have a defect and if so, they are pulled out from the tray for disposal, while the bar-shaped board members without defects are fed to a dividing device and divided into chip-shaped boards.

Recently, bar-shaped board members with defects are singled out and removed from a baking tray prior to the step of forming a side electrode thereon, in order to make the steps of manufacturing boards more efficient.

The baking tray is divided into a number of small sections, each having e.g. about 2 mm in width, and the bar-shaped board members are inserted individually into the small sections. As a space of each of the sections is too small to insert a finger of the hand therein in order to pick up the bar-shaped board member placed therein, it is difficult to pick up the bar-shaped board member with a defect and pull it out from the section of the tray. Although it is also possible to use tweezers for picking up and pulling out the bar-shaped board member with a defect from the section of the baking tray, this manual work is apparently inefficient.

Therefore, the demand for automating the work of picking up and pulling out the bar-shaped board members with defects from the sections of the baking tray has been growing rapidly in the field at electronic parts plants, etc. However, in the existing circumstances, the work for picking up and pulling out the bar-shaped board members with defects is still done manually.

SUMMARY OF THE INVENTION

The present invention has the object to provide a pickup apparatus that can solve the disadvantages and difficulty prevailing in the conventional technology as described above.

The present invention has another object to provide a pickup apparatus that is so adapted as to selectively pick up and pull out an objective thin plate member individually from a large number of thin plate members disposed in a baking tray.

A further object of the present invention is to provide a pickup apparatus that can efficiently pick up and pull out a thin plate member with a defect individually from a large number of thin plate members disposed side by side in a narrowly spaced relationship in a baking tray.

In order to achieve the objects as described above, the present invention provides a pickup apparatus so adapted as to selectively pick up and pull out an objective thin plate member individually from a number of the thin plate members placed side by side in a tray, and which comprises a pair of pincer members biased in a closing direction and an expandable bag member interposed between the pair of the pincer members.

The pickup apparatus according to the present invention may be configured such that the pincer members are opened by pouring an operating medium such as, e.g., gases or liquid, etc., into the bag member interposed between the pair of the pincer members. The operating medium poured into the bag member is discharged therefrom to allow the pair of the pincer members to close to clamp the thin plate member and pull it from the tray.

In an alternative configuration of the pickup apparatus according to the present invention, a pair of the pincer members may be allowed to close to clamp the thin plate member individually by feeding the operating medium to the bag member interposed between the pair of the pincer members. In this configuration, the pair of the pincer members are opened by discharging the operating medium from the bag member or failing to feed it thereto. In other words, the pickup apparatus in this alternative configuration may be operated to pick up the thin plate member in the manner opposite to the pickup apparatus in the other configuration as described immediately above.

In a preferred embodiment, the bag member comprises a silicone tube with one end closed and the other end open connected to and communicating with a hose, e.g., an air hose. The pickup apparatus can pick up the thin plate member without fail simply by opening and closing the pincer members so that it can perform the automation of picking up and pulling out the thin plate member from the tray expeditiously and working efficiency can be improved considerably.

In a preferred embodiment, the present invention provides the pickup apparatus wherein the thin plate member comprises a bar-shaped board member divided from a ceramic board for forming, e.g., chip resistors, etc. The pickup apparatus according to the present invention can expeditiously perform the work of picking up the bar-shaped board member with a defect from a large number of the bar-shaped board members disposed side by side in a narrowly spaced arrangement in the tray, thereby improving the steps of manufacturing chip resistors.

Other objects, features and advantages of the present invention become apparent in the course of the following description with reference to the accompanying drawings.

BRIEF DESCRIPTION OF THE DRAWINGS

FIGS. 3(a) and 3(b) are schematic views showing the state in which the pickup apparatus according to the embodiment of the present invention is operated with its essential part extended; in which FIG. 3(a) is a view showing the position of the pickup apparatus before picking up a bar-shaped board member disposed in a tray; and FIG. 3(b) is a view showing the position of the pickup apparatus that has picked up and pulled out the bar-shaped board member from the tray.

FIG. 4 is a perspective view showing the essential part of the pickup apparatus according to the embodiment of the present invention.

FIGS. 5(a) and 5(b) are schematic views showing the state in which the pickup apparatus according to another embodiment of the present invention is operated with its essential part extended; in which FIG. 5(a) is a view showing the position of the pickup apparatus before picking up a bar-shaped board member disposed in a tray; and FIG. 5(b) is a view showing the position of the pickup apparatus that has picked up and pulled out the bar-shaped board member from the tray.

DETAILED DESCRIPTION

Figure 1:
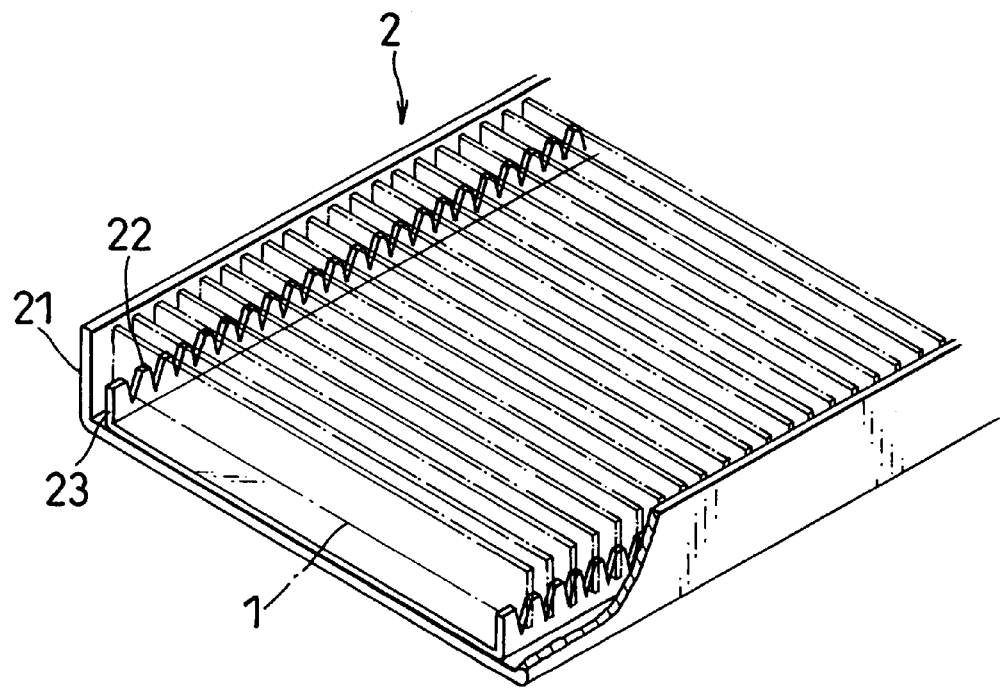
FIG. 1 is a perspective view showing a tray for accommodating bar-shaped board members in its small sections so as to be picked up and pulled out therefrom with a pickup apparatus according to an embodiment of the present invention.

The pickup apparatus according to one embodiment of the present invention is configured such that a thin plate member can be picked up and pulled out selectively and individually from a number of the thin plate members placed side by side in a tray. The pickup apparatus comprises a pair of pincer members biased in a closing direction and an expandable bag member interposed between the pair of the pincer members.

The expandable bag member may be made of any flexible material so that it can be expanded by filling it with an operating medium and it can be contracted by discharging the operating medium therefrom. As a material for use with the expandable bag member, there may be preferably employed silicone, etc., particularly in terms of its resistance to heat and to chemicals, although any material having such functions can also be employed so long as it can be expanded by the operating medium. Hence, the expandable bag member may preferably comprise, e.g., a silicone tube or a rubber tube, small in size, with its one end closed and the other end open connected to and communicating with a hose such as, e.g. an air hose, etc., through which the operating medium such as, e.g., air, etc., can be fed to and discharged from the bag member.

As the operating medium for expanding and contracting the bag member, there may be preferably employed air although any fluid including, e.g., liquid or gases, can be employed so long as it can expand and contract the bag member.

Filling the bag member with the operating medium, e.g., air, can expand the bag member to open a pair of the pincer members, thereby allowing them to become ready to clamp a desired thin plate member. On the other hand, discharging the operating medium from the bag member contracts the bag member to close the pair of the pincer members to clamp the desired thin plate member. Further, the pair of the pincer members are opened by filling the bag member with the operating medium to release the thin plate member clamped thereby.

Alternatively, filling the bag member with the operating medium may expand the bag member to close the pair of the pincer members and discharging the operating medium from the bag member may contract the bag member to open the pair of the pincer members. In this configuration, as a matter of course, the thin plate member can be clamped with the pair of the pincer members as they are closed by feeding the operating medium to the bag member, while it can be released from the pair of the pincer members as they are opened by discharging the medium from the bag member.

With such a simple configuration, the pickup apparatus according to the present invention can automate the step of selectively picking up and pulling out a desired thin plate member individually from a large number of the thin plate members and improve working efficiency in manufacturing the thin plate members.

The thin plate member to be applied to the pickup apparatus according to the present invention may comprise a bar-shaped board member which can be further processed into electronic parts such as, e.g., chip resistors, etc.

The thin plate members are fed to a baking furnace in a state in which they are placed side by side in a narrowly spaced relationship on a baking tray after they are coated with a paste for forming an electrode in the step of forming a side electrode on the bar-shaped board member.

Before baking the bar-shaped board members in the baking furnace, a defect caused by the board member itself or in the electrode coated on the board member is discovered in a binary way from a picture taken with a camera of the identification unit and the bar-shaped board member with such a defect is identified with an identification unit so as to be picked up and pulled out from the other bar-shaped board members placed on the tray. By coupling the identification unit with the pickup apparatus according to the present invention so as for the pickup apparatus to work together with the identification unit, the bar-shaped board member with a defect can be pulled out from the tray and thrown away automatically.

A brief description will be made of the manner in which the bar-shaped board member with a defect is identified and pulled out from the tray with the pickup apparatus according to the present invention. The pickup apparatus with a pair of the pincer members is disposed so as to transfer the bar-shaped board member with a defect from the position of the tray to the position of a disposal box into which the bar-shaped board members with defects are to be thrown away. The pickup apparatus is further configured such that information on the position of the bar-shaped board member with a defect identified with the identification unit is stored in a memory. The pickup apparatus is transferred to the position of the bar-shaped board member with the defect in accordance with the information stored in the memory and the pair of the pincer members are ready for picking up the bar-shaped board member. The pincer members are then opened by filling the bag member interposed between them with the operating medium such as, e.g., air, and lowered over the bar-shaped board member to be pulled out from the tray. Thereafter, the operating medium is discharged from the bag member and the pincer members are closed to pick up the bar-shaped board member and then raised upward.

The pickup apparatus is then transferred to the position of the disposal box and the bag member is filled with, e.g., air, to open the pincer members releasing the bar-shaped board member therefrom and throwing it away into the disposal box. Further, the pickup apparatus is transferred again to the position of the other bar-shaped board member with a defect identified with the identification unit and memorized therewith, thereby repeating the steps of picking up and pulling out the bar-shaped board member with the defect and throwing it away into the disposal box.

In an alternative configuration of the pickup apparatus according to the embodiment of the present invention, as briefly described above, the pickup apparatus may be configured such that the pair of the pincer members are closed to clamp the bar-shaped board member with a defect by feeding the operating medium to the bag member interposed between the pair of the pincer members to expand the bag member. In this configuration, the pair of the pincer members can be opened to release the bar-shaped board member clamped therewith for disposal by contracting the bag member by discharging the operating medium therefrom.

As is obvious from the description as described above, the pickup apparatus according to the present invention has a simple configuration and can readily pick up and pull out the thin plate members from a tray automatically and improve the work of pulling out the thin plate members from the tray.

It is noted that the present invention is construed as being not limited in any respect to the configurations and aspects as described above and as encompassing any variations and modifications without departing from the spirit and scope of the present invention.

The present invention will now be described in more detail with reference to the accompanying drawings. In an embodiment of the present invention, the thin plate member to be picked up and pulled out with the pickup apparatus according to the present invention may comprise a bar-shaped board member. The bar-shaped board member may comprise a board member in a band form which is divided from a large-size ceramic board for forming chip resistors upon manufacturing chip resistors, etc. and which is divided into small-size chips for processing into single chip resistors.

FIG. 1 shows bar-shaped board members 1 disposed side by side in a narrowly spaced relationship in a tray 2 for use upon baking the bar-shaped board members 1. The tray 2 is configured such that an inner frame 23 is disposed in raised side edges 21 of the tray 2 and the inner frame 23 is provided with a number of V-shaped grooves 22 in a saw-toothed form at its raised side edges opposite to each other. The interval of the adjacent V-shaped grooves 22 may be about 2 mm. The bar-shaped board members 1 are placed extending between and over the opposite V-shaped grooves 22 and held therewith in an engaged manner.

Figure 2:
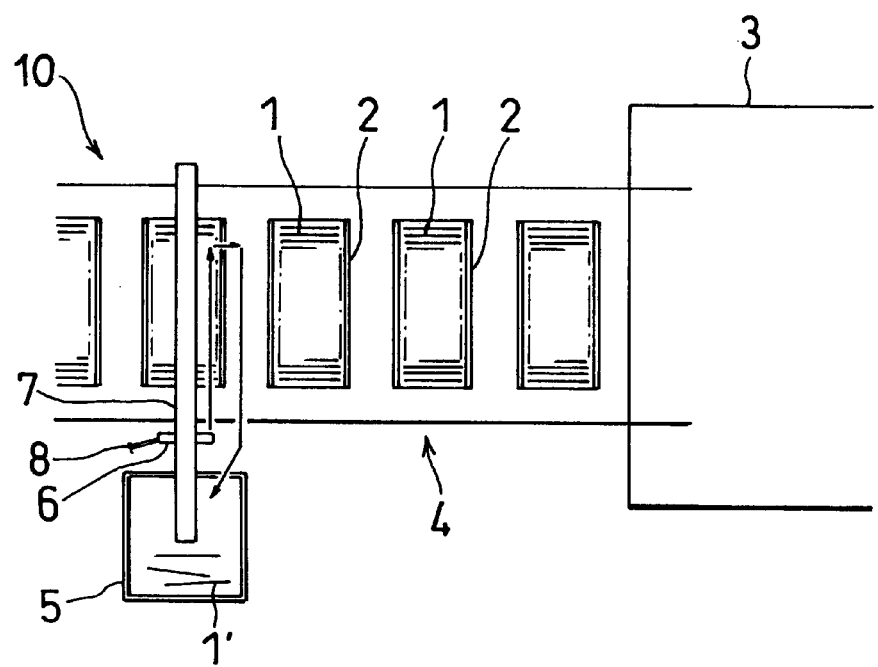
FIG. 2 is a schematic view showing the position in which the pickup apparatus according to the embodiment of the present invention is disposed with respect to the tray on which the bar-shaped board members are placed.

FIG. 2 shows the state of disposition of a pickup apparatus 10 according to the present invention. The pickup apparatus 10 is disposed in an intermediate position of a line 4 carrying the tray 2 to a baking furnace 3, together with an identification unit (not shown) for determining the quality of the bar-shaped board members placed in the tray 2 by binary recognition. The pickup apparatus 10 is electrically coupled with the identification unit through a control unit, also not shown, and the pickup apparatus 10 can pick up the bar-shaped board member 1 that is determined not to be good by the identification unit and then pull out it from the tray 2 automatically. The bar-shaped board member 1 pulled out from the tray 1 is then carried to a disposal box 5 disposed outside the line 4. In FIG. 2, reference numeral 1' denotes a bar-shaped board member with a defect.

The pickup apparatus 10 comprises a pickup section 6 disposed so as to move along a rail member 7 disposed intersecting over the line 4. As shown in FIG. 2, the pickup section 6 is oriented in a direction substantially perpendicular to the rail member since the rail member 7 extends over the trays 1 perpendicular to the bar-shaped board members 1.

FIGS. 3(a), 3(b) and 4 show each the pickup section 6 acting as the essential part of the pickup apparatus 10 according to the present invention. As shown in FIGS. 3(a), 3(b) and 4, the pickup section 6 comprises a support carrier 61 mounted on the rail member 7, an arm section 62 in an inverted V-shaped form with its top end portion biased always in a closing direction, which is disposed adjacent to the support carrier 61, pincer members 63 mounted on the top end of the arm section 62, and a silicone tube 9 disposed between the pincer members 63, which has one end closed forming a bag member and its other end connected to and communicating with an air hose 8. In the drawings, reference numeral 91 denotes a support piece of the silicone tube 9 which is disposed adjacent to the arm section 62. Reference numeral 92 denotes a lid for closing the silicone tube 9.

The silicone tube 9 may be very small, resistant to heat and chemicals, and high in durability. Further, the silicone tube 9 is so flexible as to expand, as shown in FIG. 3(a), by the supply of the operating medium, e.g., air, and to contract and return to its original size, as shown in FIG. 3(b), by discharging the operating medium therefrom.

When the silicone tube 9 is filled with air as the operating medium, it expands to open the pincer members 63 so that they are ready to pick up the bar-shaped board member 1. When the air is discharged from the silicone tube 9, the silicone tube 9 is caused to contract to close the pincer members 63 so that they grasp and pick up the bar-shaped board member 1.

Now, a description will be made of the manner of using the pickup apparatus 10 according to an embodiment of the present invention.

After the bar-shaped board members 1 are coated with a paste for forming a side electrode thereon, a number of the bar-shaped board members 1 are placed in the tray 2, e.g., as shown in FIG. 1. During the course of carrying the tray 2 with the bar-shaped board members 1 disposed therein to the baking furnace 3, the bar-shaped board members 1 are investigated by the identification unit as to whether their quality is inappropriate for the products, such as, e.g., a defect of a coating of paste, a defect in a size of a board member, etc. Whether the bar-shaped board member 1 is good or not for further processing, e.g., chip resistors, etc. is determined by taking a picture of each of the bar-shaped board members 1 disposed in the tray 2 with a camera of the identification unit and subjecting the picture to graphic processing for binary recognition.

If a bar-shaped board member 1 is determined not to be good by binary recognition of the graphic processing with the control unit of the identification unit, the position of the bar-shaped board member 1 with a defect is stored in a memory and a drive signal is transmitted to the pickup apparatus 10.

Upon receipt of the drive signal, the pickup apparatus 10 is transferred to the position of a bar-shaped board member 1 with a defect stored in the memory by moving the support carrier 61 along the rail member 7 to the position involved. The pickup apparatus 10 is then lowered to the position of the first bar-shaped board member 1, together with the support carrier 61, so as to allow the pincer members 63 to pick up the bar-shaped board member 1. The pincer members 63 are opened by supplying air to the silicone tube 9, as shown in FIG. 3(a), for example, upon lowering the pickup apparatus 10 to the position of the bar-shaped board member 1 to pick up and pull out the bar-shaped board member from the tray 2. As the pickup apparatus 10 is lowered to enable the pincer members 63 to pick up the bar-shaped board member 1, once the pincers 63 are around the bar-shaped board member, the air is discharged from the silicone tube 9 to contract the silicone tube 9 and close the pincer members 63 to grasp or pick up the bar-shaped board member 1.

After the pincer members 63 have clamped the bar-shaped board member 1, the pickup apparatus 10 is raised to pull out it from the tray 2, as shown in FIG. 3(b), and transferred with the bar-shaped board member 1 clamped therewith to the disposal box 5 outside the line 4. As the pickup apparatus 10 reaches the disposal box 5, the air is fed again to the silicone tube 9 to open the pincer members 63 and the bar-shaped board member 1 picked up with them is released therefrom and thrown away into the disposal box 5, as shown in FIG. 2.

The pickup apparatus 10 is then transferred to the position of a second bar-shaped board member 1 with a defect on the basis of information stored in the memory, followed by picking up and pulling out that bar-shaped board member 1 from the tray 2 and discharging it to the disposal box 5.

The work comprised of the steps as described above is repeated until all the bar-shaped board members 1 with defects have been discharged from the tray 2. once all the bar-shaped board members 1 with defects are discharged from the tray 2 and the bar-shaped board members 1 disposed in the tray 2 are all free from any defect, the tray 2 is then transferred to the baking furnace 3 in which the bar-shaped board members 2 are baked at a predetermined temperature for a predetermined period of time to form a side electrode on each bar-shaped board member 2.

The pickup apparatus 10 according to the embodiment of the present invention can easily pick up and pull out a desired bar-shaped board member 1 individually from a number of the bar-shaped board members 1 disposed side by side in a narrowly spaced relationship in the tray 2. Further, the pickup apparatus 10 does not cause any damage to or break the bar-shaped board member 1 upon picking up and pulling out it because no force is applied to the pincer members 63 in excess of the predetermined force biasing the pincer members in a closing direction.

FIGS. 5(a) and 5(b) show a pickup section 6 of the pickup apparatus 10 according to another embodiment of the present invention, in which the identical elements are provided with the identical reference numerals and symbols indicated in the previous drawings in order to avoid a duplicate description.

The pickup apparatus 10 according to another embodiment of the present invention comprises a pair of pincer members 63 in a general crank form in which the pincer members 63 intersect each other at an intermediate portion. In FIGS. 5(a) and 5(b), reference numeral 64 denotes an intersecting portion.

In this embodiment, the action of opening and closing the pincer members 63 is arranged so as to be performed in a way opposite to the action thereof to be performed in the previous embodiment by supplying air to the silicone tube 9 and discharging it therefrom or failing to supply it thereto.

More specifically, in this embodiment, the pincer members 63 are open, as shown in FIG. 5(a), when no air is fed to the silicone tube 9, while they are closed to pick up a bar-shaped board member 1, as shown in FIG. 5(b), when air is fed thereto. In other words, when no air is fed to the silicone tube 9 and it is in a contracted state, the pincer members 63 are kept open so that they cannot pick up the bar-shaped board member 1. On the other hand, when the silicone tube 9 is fed with air and it is expanded, the pincer members 63 are allowed to close, thereby picking up the bar-shaped board member 1.

It is noted that the present invention is construed as being not limited to the embodiments as described above and encompassing any variations or modifications thereof without departing from the spirit and the scope of the present invention.

In each of the above embodiments, for instance, the arm section 62 disposed adjacent to the support carrier 61 and the pincer members 63 disposed adjacent thereto are each in an elongated form having a size so as to nearly correspond to the width of the tray 2, as shown in FIGS. 2 and 4. It is noted, however, that the sizes thereof may be set to be smaller than the width of the tray 2. Further, the pickup apparatus may be provided with a plurality of the pickup sections 6 having such a smaller size so as to pick up the bar-shaped board member 1 at its plural positions.

It is further noted that as the operating medium to be fed to the silicone tube 9 gases other than air or liquid may also be employed in place of air.

The present invention can be practiced in the manner as described above and offers the features and advantages as will be described hereinafter.

The pickup apparatus according to the present invention is configured such that a thin plate member can be selectively picked up and pulled out individually from a large number of the thin plate members disposed side by side in a narrowly spaced relationship in the tray by means of a pair of pincer members in association with an expandable bag member interposed between the pair of pincer members. The pincer members are disposed so as to be biased in a closing direction are open by feeding or failing to feed an operating medium to the bag member or discharging it therefrom and they are closed to pick up the bar-shaped board member by discharging the operating medium from the bag member or feeding it thereto. This configuration of the pickup apparatus according to the present invention can pick up the thin plate member with ease without causing any damages on or breakage of the thin plate member because the thin plate member can be picked up with the pincer members by the force not larger than the force biasing them.

Further, the pickup apparatus according to the present invention uses the silicone tube as the bag member, which has its one end closed and its other end open connected to and communicating with a hose for supplying the operating medium, e.g. air, so that the pincer members can be opened and closed in such a simple configuration and the thin plate member can be picked up and pulled out without failure. This simple configuration of the pickup apparatus according to the present invention can easily automate the picking up and pulling out of the thin plate member selectively and individually from a large number of the thin plate members and at the same time improve the work efficiency to a great extent.

Moreover, the pickup apparatus according to the present invention can be applied to bar-shaped board members divided from a ceramic board for forming chip resistors, etc. as the thin plate member so that the bar-shaped board member with a defect can be selectively removed from a large number of the bar-shaped board members without any defect with high efficiency and the work for manufacturing, e.g. chip resistors, etc., can be made more efficient.

What is claimed is:

1. A pickup apparatus disposed together with an identification unit which detects a defect of a bar-shaped board member along a line on which a tray having a number of bar-shaped board members alongside one another is carried, the pickup apparatus comprising:

a rail member adapted to extend across the line;

a pair of pincer members disposed movably along said rail member and biased in a direction in which said pair of pincer members are closed;

an expandable bag member which expands upon filling with an operating medium; and said bag member being interposed between said pair of pincer members such that when said bag member is filled with the operating medium, said bag member expands and urges said pair of pincer members apart to an open position and when the operating medium is discharged from said bag member, said bag member contracts and said pair of pincer members close and enable said pair of pincer members to clamp one of the bar-shaped board members therebetween;

whereby a bar-shaped board member with a defect as determined by the identification unit is clamped by said pair of pincer members and then evacuated from the tray and transferred outside the line.

2. A pickup apparatus as claimed in claim 1, wherein the operating medium is air and said bag member comprises a silicone tube having a closed end and an open end connected to and communicating with a hose for supplying the operating medium to said bag member.

3. A pickup apparatus as claimed in claim 1, further comprising:

a support carrier mounted on said rail member; and an arm section connected to said support carrier.

4. A pickup apparatus as claimed in claim 3, wherein said pair of pincer members are mounted on said arm section.

5. A pickup apparatus as claimed in claim 3, wherein said arm section has an inverted V-shaped form.

6. A pickup apparatus as claimed in claim 3, further comprising a support piece arranged adjacent said arm section for supporting said bag member.

7. A pickup apparatus as claimed in claim 1, wherein said bag member comprises a tube having a closed end and an open end adapted to be connected to and communicate with a hose for supplying the operating medium to said bag member.

8. A pickup apparatus as claimed in claim 7, further comprising a lid for closing said tube.

9. A pickup apparatus disposed together with an identification unit which detects a defect of a bar-shaped board member divided from a ceramic board for forming a chip resistor along a line on which a tray having a number of bar-shaped board members alongside one another is carried, the pickup apparatus comprising:

a rail member adapted to extend across the line;

a pair of pincer members disposed movably along said rail member and biased in a direction in which said pair of pincer members are closed;

an expandable bag member which expands upon filling with an operating medium; and said bag member being interposed between said pair of pincer members such that when said bag member is filled with the operating medium, said bag member expands and urges said pair of pincer members apart to an open position and when the operating medium is discharged from said bag member, said bag member contracts and said pair of pincer members close and enable said pair of pincer members to clamp one of the bar-shaped board members therebetween;

wherein a bar-shaped board member with a defect as determined by the identification unit is clamped by said pair of pincer members and then evacuated from the tray and transferred outside the line.

10. A pickup apparatus for picking up individual thin plate members from a tray of thin plate members comprising:

a rail member adapted to extend across the tray;

a pair of pincer members arranged to move along said rail member, said pair of pincer members being biased toward one another; and an expandable bag member which expands upon filling with an operating medium;

said bag member being arranged between said pair of pincer members such that when said bag member is filled with the operating medium, said bag member expands and urges said pair of pincer members apart to an open position and when the operating medium is discharged from said bag member, said bag member contracts and said pair of pincer members close and enable said pair of pincer members to clamp one of the thin plate members therebetween.

11. A pickup apparatus as claimed in claim 10, wherein said bag member comprises a tube having a closed end and an open end adapted to be connected to and communicate with a hose for supplying the operating medium to said bag member.

12. A pickup apparatus as claimed in claim 10, further comprising:

a support carrier mounted on said rail member; and an arm section connected to said support carrier.

13. A pickup apparatus as claimed in claim 12, wherein said pair of pincer members are mounted on said arm section.

14. A pickup apparatus as claimed in claim 12, wherein said arm section has an inverted V-shaped form.

15. A pickup apparatus as claimed in claim 12, further comprising a support piece arranged adjacent said arm section for supporting said bag member.

16. A pickup apparatus according to claim 10, wherein said pair of pincer members are part of a pickup section oriented in a direction substantially perpendicular to said rail member.

* * * * *